United States Patent [19]

Amano

[11] Patent Number: 5,274,650
[45] Date of Patent: Dec. 28, 1993

[54] SOLID STATE LASER
[75] Inventor: Satoru Amano, Akishima, Japan
[73] Assignee: Hoya Corporation, Tokyo, Japan
[21] Appl. No.: 813,682
[22] Filed: Dec. 27, 1991
[30] Foreign Application Priority Data
   Dec. 28, 1990 [JP] Japan ............... 2-408661
[51] Int. Cl.⁵ ................................. H01S 3/10
[52] U.S. Cl. ........................... 372/21; 372/68;
                                         372/92; 372/22
[58] Field of Search ........... 372/21, 22, 68, 69,
                                         372/92; 359/378
[56]         References Cited
         U.S. PATENT DOCUMENTS
   4,884,277  11/1989  Anthon et al. .................. 372/21
   5,047,668   9/1991  Bosenberg ....................... 372/21
   5,058,118  10/1991  Qui et al. ......................... 372/22
   5,117,126   5/1992  Geiger ............................. 372/21
   5,121,400   6/1992  Verdiell et al. ................. 372/21

Primary Examiner—Leon Scott, Jr.
Attorney, Agent, or Firm—Oliff & Berridge

[57]           ABSTRACT

A solid state laser provided with a pair of mirrors constituting a laser resonator and a plurality of non-linear optical crystals placed between the pair of mirrors in such a manner to have an optical axis in common therewith and a pump source for irradiating pump light on the plurality of non-linear optical crystals. In the solid state laser, the non-linear optical crystals are operative to generate both of fundamental-wave laser light and harmonic laser light in response to the pump light.

5 Claims, 2 Drawing Sheets

SOLID STATE LASER

BACKGROUND OF THE INVENTION

1. Field of The Invention

This invention relates to a solid state laser for obtaining harmonic laser light by using a non-linear optical crystal.

2. Description of The Related Art

A typical conventional solid state laser, which obtains harmonic laser light by employing a non-linear optical crystal, has a configuration as illustrated in, for example, FIG. 2.

In case of this example of the conventional solid state laser of FIG. 2, a laser medium 1 and a Q-switch element 5 are placed between a pair of mirrors 3 and 4, which constitute an optical resonator, in such a manner to have a common optical axis. Further, pulse-like fundamental-wave laser light L, is emitted by making a Q-switch element 5 operate simultaneously with a pumping of the laser medium 1 by using a pumping flash lamp 2. Then, the fundamental-wave laser light $L_2$ is made to be incident on a non-linear optical crystal 6 placed outside the laser so as to obtain second-harmonic laser light $L_2$. In case where a crystal of YAG($Y_3Al_5O_{12}$) including Nd (neodymium) ions is employed as the laser medium 1 and a crystal of KTP($KTiOPO_4$) is used as the non-linear optical crystal 6 of this configuration, laser light having a wavelength of 1.064 microns ($\mu$m) is obtained as the fundamental-wave laser light $L_1$. Consequently, green laser light, the wavelength of which is 0.532 $\mu$m, is obtained as the second-harmonic laser light $L_2$. Incidentally, a Pockels element (e.g., a crystal of KD#P (basically potassium dihydrogen phosphate (KDP) with the hydrogen replaced by deuterium)) or an acoustooptic element may be employed as the Q-switch element 5. Thereby, high-peak-power laser light can be obtained as the fundamental-wave laser light $L_1$. Thus relatively-high-peak-power pulse-like second-harmonic laser light can be obtained.

Moreover, there has been proposed another conventional solid state laser which simultaneously generates fundamental-wave laser light and second-harmonic laser light by using a non-linear optical crystal itself, thereby further miniaturizing the laser (see L. Baosheng et al., Chinese Phys. Lett., Vol. 3, No. 9, 413, 1986, and T. Y. Fan et al., J. Opy. Soc. Am. B., Vol. 3, No. 1, 140, 1986). This conventional laser utilizes a non-linear crystal of, for example, NYAB($Nd_xY_xY_{1-x}Al_3(BO_3)_4$) or Nd:MgO:LiNbO$_3$ which serves both as a laser medium and a non-linear optical crystal. Namely, if such a non-linear optical crystal is pumped in an optical resonator by light emitted from a lamp or a laser, fundamental-wave laser light is generated. Moreover, if phase matching conditions are satisfied, such a non-linear optical crystal by itself generates second-harmonic laser light, the frequency of which is twice that of the fundamental-wave laser light. Thus the laser light, the wave length of which is one-half that of the fundamental-wave laser light, is emitted from the resonator to the outside. Incidentally, the phase matching conditions are conditions of an angle of incidence, at which the fundamental-wave laser light impinges on the non-linear optical crystal, and/or the temperature of the crystal to be satisfied for obtaining specific non-linear optical effects.

Further, in case of the configuration, in which the non-linear optical crystal 6 is placed outside the laser, as illustrated in FIG. 2, the fundamental-wave laser light $L_1$ is made to be incident on the non-linear optical crystal 6 after extracted from the resonator. Namely, the fundamental-wave laser light $L_1$ is extracted to the outside after passing through the mirror 4, which is adapted to transmit part of the fundamental-wave laser light $L_1$, of the resonator. Thus part of energy of the fundamental-wave laser light $L_1$ is lost when the laser light $L_1$ travels through the mirror 4. This means that not all of the fundamental-wave laser light $L_1$ is made to be incident on the non-linear optical crystal 6 and does not contribute to the generation of second-harmonic laser light $L_2$ and that part of the fundamental-wave laser light $L_1$ is wasted. Additionally, the conventional laser, the configuration of which the non-linear optical crystal 6 is placed outside the laser, has drawbacks in that after the optical axis of the optical resonator is regulated in such a manner that the resonator can serve as a laser oscillator for emitting the fundamental-wave laser light $L_1$, there is necessity of performing an additional cumbersome operation of making the optical axis of the non-linear optical crystal 6 accord with the regulated optical axis of the optical resonator. Further, the manufacturing cost is high because a large number of components are required.

On the other hand, in case of the conventional laser of the type in which the non-linear optical laser generates the fundamental-wave laser light as well as the second-harmonic laser light, there is a certain limit to the effective interaction length of the non-linear optical crystal. Thus there is also a certain limit to the intensity of the obtained second-harmonic laser light. Especially, in case of a birefringent non-linear optical crystal, a wave-surface progress direction, in which a cophasal surface (i.e., a wave surface) of a wave progresses, does not accord with a ray propagation direction, in which energy of the wave propagates. Namely, there occurs a difference between these directions. Let $\theta$ denotes an angle formed by lines, which are respectively extending in these directions, emanating from a point of intersection of these lines; and D a beam diameter of the fundamental-wave laser light $L_1$. It is known in the art that even if the phase matching conditions are satisfied, an effective interaction length is limited to a value of the order of $D/\theta$. This phenomenon is generally called as a walk-off effect. Further, the angle $\theta$ is called as a walk-off angle. The interaction length of a non-linear optical crystal is limited due to this walk-off effect. As the result, an effective length required for generating the fundamental-wave laser light is inevitably limited to a certain value. Thus, there occurs a limit of intensity of the obtained fundamental-wave laser light. Consequently, there also occurs a certain limit of intensity of the second-harmonic laser light obtained from the fundamental-wave laser light. The present invention is accomplished to eliminate the above described drawbacks of the conventional lasers.

It is, therefore, an object of the present invention to provide a solid state laser which has a relatively simple configuration and can effectively obtain harmonic laser light of high intensity.

SUMMARY OF THE INVENTION

To achieve the foregoing object, in accordance with an aspect of the present invention, there is provided a solid state laser (hereunder referred to as a first solid state laser) which comprises a pair of mirrors constituting a laser resonator (namely, an optical resonator), a plurality of non-linear optical crystals placed between the pair of mirrors in such a manner to have an optical axis in common therewith and a pump source for irradiating pump light on the plurality of non-linear optical crystals, wherein non-linear optical crystals, which generate both of fundamental-wave laser light and harmonic laser light in response to the pump light, are employed as the plurality of non-linear optical crystals.

Thus, even in case of employing a material by which a large crystal cannot easily be formed, a given length can be set as the effective length.

Further, in accordance with another aspect of the present invention, there is provided a solid state laser (hereunder referred to as a second solid state laser) which comprises composing elements of the first solid state laser and in which the plurality of non-linear optical crystals are arranged in such a way that the difference between the ray propagation direction of the fundamental-wave laser light and the wave-surface progress direction of the cophasal surface is canceled by making crystallographic axes of contiguous ones of the plurality of non-linear optical crystals differ from one another.

Thus contiguous non-linear optical crystals interact with each other in such a fashion that walk-off effects are canceled. Consequently, a long effective interaction length, which is substantially equal to a sum of lengths of the plurality of non-linear optical crystals, can be secured independently of the walk-off effect. Thus strong fundamental-wave laser light can be emitted by the second solid state laser having a relatively simple configuration. Consequently, strong harmonic laser light can be obtained.

Moreover, in accordance with still another aspect of the present invention, there is provided a solid state laser (hereunder referred to as a third solid state laser) which comprises composing elements of the second solid state laser and in which the crystallographic axes of the plurality of non-linear optical crystals are established in such a manner that a specific crystallographic axis of given one of the non-linear optical crystals perpendicular to an optical axis thereof, which includes the progress direction of the fundamental-wave laser light propagating through the given one of the non-linear optical crystals, is inclined at 180° to a crystallographic axis, which corresponds to the specific crystallographic axis, of another non-linear optical crystal adjoining to the given one of the non-linear optical crystals.

Thus the effects of the second solid state laser can be substantially intensified.

Furthermore, in accordance with a still further aspect of the present invention, there is provided a solid state laser (hereunder referred to as a fourth solid state laser) which comprises the composing elements of any one of the first to third solid state lasers, wherein a Q-switch element is placed in the laser resonator.

Thus pulse-like high-peak power laser light can be obtained.

Further, in accordance with yet another aspect of the present invention, there is provided a solid state laser (hereunder referred to as a fifth solid state laser) which comprises the composing elements of any one of the first to fourth solid state lasers, wherein the plurality of non-linear optical crystals are accommodated in a transparent tube.

Thus the regulation of the optical axis can be facilitated.

Moreover, in accordance with a further aspect of the present invention, there is provided a solid state laser (hereunder referred to as a sixth solid state laser) which comprises the composing elements of the fourth solid state lasers, wherein the transparent tube is a Ce-doped quartz tube. Thus, in case of pumping non-linear optical crystals by using a lamp, ultraviolet rays included in pump light emitted from the lamp can be cut off. Moreover, solarization of the non-linear crystals can be prevented.

Furthermore, in accordance with an additional aspect of the present invention, there is provided a solid state laser (hereunder referred to as a seventh solid state laser) which comprises the composing elements of any one of the first to sixth solid state lasers, wherein the plurality of non-linear optical crystals are made of $NYAB(Nd_xY_{1-x}Al_3(BO_3)_4)$.

Thus the characteristic features of the first to sixth solid state lasers can effectively be utilized.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DETAILED DESCRIPTION OF THE PREFERRED EMBODIMENT

Hereinafter, a preferred embodiment of the present invention will be described in detail by referring to the accompanying drawings.

Figure 1:
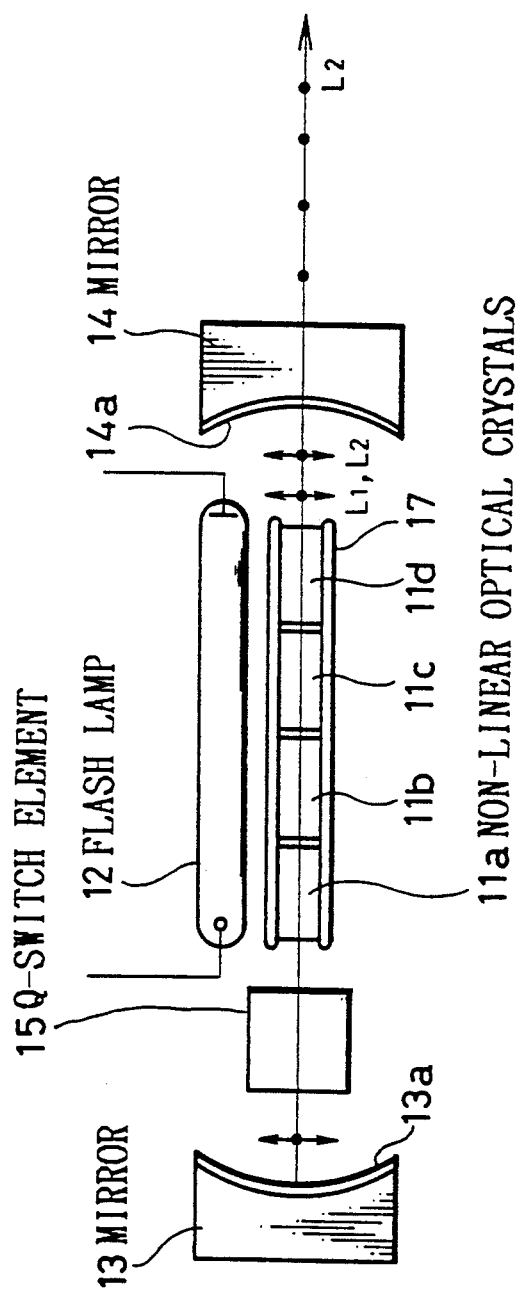
FIG. 1 is a diagram for illustrating the configuration of a solid state laser embodying the present invention.
Figure 2:
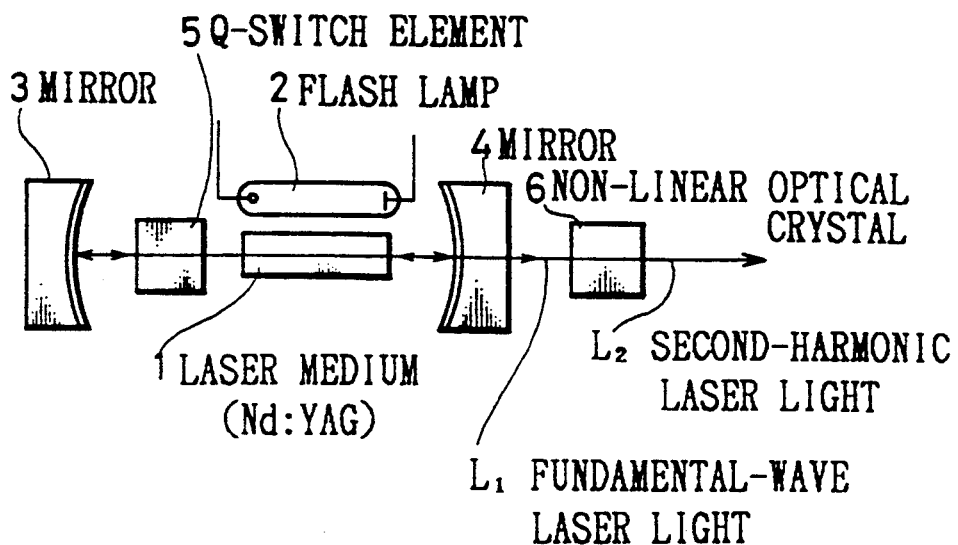
FIG. 2 is a diagram for illustrating the configuration of a conventional solid state laser.
Figure 3:
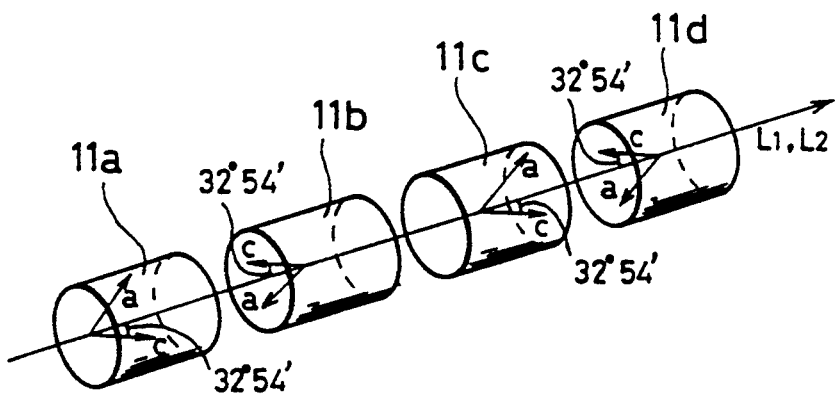
FIG. 3 is a diagram for illustrating the crystallographic axes of non-linear optical crystals employed in the embodiment of FIG. 1.

FIG. 1 is a diagram for illustrating the configuration of a solid state laser embodying the present invention. Further, FIG. 3 is a diagram for illustrating the crystallographic axes of non-linear optical crystals employed in the embodiment of FIG. 1.

In these figures, reference characters 11a, 11b, 11c and 11d designate non-linear optical crystals; reference character 12 designates a flash lamp employed as a pump source; reference characters 13 and 14 designate a pair of mirrors constituting a laser resonator; reference character 15 designates a Q-switch; and reference character 17 designates a quartz tube.

Each of the non-linear optical crystals 11a, 11b, 11c and 11d is formed in the following manner. Namely, first, a negative crystal of the type TYPE1 is formed by cutting a crystal (hereunder referred to as NYAB crystal) of $NYAB(Nd_xY_{1-x}Al_3(BO_3)_4)$ from a direction oriented at a predetermined angle to a predetermined crystallographic axis thereof. Then, the negative crystal is shaped into a cylinder (20 millimeters (mm) $\phi \times 5$ mm) in such a fashion that cut surfaces are both of end surfaces of the cylinder. These non-linear optical crystals 11a, 11b, 11c and 11d have the properties of simultaneously generating fundamental-wave laser light $L_1$, the wavelength of which is 1.062 μm, and second-harmonic laser light $L_2$, of which the wavelength is 0.531 μm and the frequency is twice that of the fundamental-wave laser light $L_1$, by itself when pump light is irradiated thereon. Incidentally, an anti-reflection dielectric multilayer film adheres to each of end surfaces of these non-linear optical crystals 11a, 11b, 11e and 11d in such a way that the transmittance of each of the end surfaces becomes more than or equal to 99% when the fundamental-wave laser light, the wavelength of which is 1.062 μm, and the second-harmonic laser light, the wavelength of which is 0.531 μm, are incident thereon.

Further, these non-linear optical crystals 11a, 11b, 11e and 11d are accommodated and fixed in the quartz tube 17 in such a manner that a central axis becomes common to the crystals 11a, 11b, 11c and 11d, that there is a certain relation among the crystallographic axes of these crystals, that these crystals are arranged in a line in series and that an end surface of each of the crystals faces and is close to an end surface of an adjoining crystal.

FIG. 3 is a diagram for illustrating the crystallographic axes of non-linear optical crystals employed in the embodiment of FIG. 1. These crystals are NYAB crystals of the type TYPE1 and thus are negative crystals. Further, the walk-off angle of each of the non-linear optical crystals is about 39 milliradian (mrad). In case where the beam diameter of the fundamental laser light $L_1$ is 0.15 mm φ, the effective interaction length of each of these NYAB crystals is approximately 6.8 mm. Thus the non-linear optical crystals are set in such a manner that the c-axis, which is a crystallographic axis inclined at 32° 54' to the progress direction of the fundamental-wave laser light $L_1$, of each non-linear optical crystal is rotated 180° around the common optical axis from the c-axis of an adjoining non-linear optical crystal. Thereby, cophasal-wave light, the progress direction of which is changed in, for example, the non-linear optical crystal 11a due to the walk-off effects, is incident on the non-linear optical crystal 11b in which the cophasal-wave light is subject to the influence of the walk-off effect. The difference, which is caused in the non-linear optical crystal 11b, between the ray propagation direction of the fundamental-wave laser light and the wave-surface progress direction of the cophasal-wave light is just contrary to that caused in the non-linear optical crystal 11a. This results in that the difference caused in the crystal 11b is canceled. The cophasal-wave light is subject to the similar influence of the walk-off effect in the non-linear optical crystals 11c and 11d. Consequently, the influence of the walk-off effect of each of the four non-linear optical crystals 11a, 11b, 11e and 11d is canceled by that of the walk-off effect of a contiguous non-linear optical crystal. As the result, substantially the same effect as obtained in case where the effective interaction length is equal to the total length of the four non-linear optical crystals can be obtained. Incidentally, the quartz tube 17 is formed by shaping the Ce-doped quartz crystal, of which Ce absorbs ultraviolet light, into a cylinder, of which the inside diameter is a little larger than 2 mm φ and the tube length is a little longer than the total length of the non-linear optical crystals 11a, 11b, 11e and 11d.

Further, the a-axis and the c-axis of the NYAB crystal of the type TYPE1 are the ray axis (hereunder referred to as the ordinary ray axis) of an ordinary ray and that (hereunder referred to as the extraordinary ray axis) of an extraordinary ray, respectively. The a-axis, the c-axis and the propagation direction of the fundamental-wave laser light are coplanar. Moreover, the a-axis (namely, the ordinary ray axis) perpendicular to the c-axis (namely, the extraordinary ray axis) is inclined at 120° to the other ordinary ray axis (namely, the b-axis (not shown) of the NYAB crystal of the type TYPE1).

Furthermore, the quartz tube 17 which accommodates the non-linear optical crystals 11a, 11b, 11c and 11d is placed between the pair of mirrors 13 and 14 which constitute the laser resonator in such a way to have the optical axis common to the mirrors. These mirrors 13 and 14 are made by shaping the surfaces, which face each other, of transparent members into concave surfaces and then coating each of the concave surfaces with a multi-layer film to thereby form reflecting surfaces 13a and 14a. In this case, the reflecting surface 13a has the property of performing total reflection of both of the light having the wavelength of 1.062 μm and that having the wavelength of 0.531 μm. In contrast, the reflecting surface 14a has the property of performing total reflection of the light having the wavelength of 1.062 μm but transmitting almost all of the light having the wavelength of 0.531 μm.

Moreover, the Q-switch element 15 is placed between the quartz tube 17, which accommodates the non-linear optical crystals 11a, 11b, 11c and 11d, and the mirror 13 in such a fashion to have the common optical axis. This element 15 is a passive Q-switch element made by shaping a crystal of LiF, which is a crystal of an alkaline halide, into a cylinder (3 mmφ × 30 mm) and forming a color center in the crystal of LiF by irradiating γ-rays on the cylinder by using cobalt-60 (namely, $^{60}Co$).

Additionally, the flash lamp 12, which may be a xenon lamp or a krypton lamp, is placed in the vicinity of the quartz tube 17. A control device (not shown) controls a light emitting operation of the flash lamp.

In the above described configuration of the embodiment, an oscillation of the fundamental-wave laser light $L_1$ occurs in the laser resonator when the flash lamp 12 is made to emit light. Then, the q-switch element 15 operates, and high-peak-power pulse-like laser light, the pulse width of which is 10 nanoseconds (nsec), is emitted. Simultaneously, the second-harmonic laser light, of which the wavelength is 0.531 μm and the frequency is twice that of the fundamental-wave laser light $L_1$, is extracted to the outside through the mirror 14 by utilizing non-linear optical effects.

By this embodiment, a long effective length enough to generate the fundamental-wave laser light can be secured. Moreover, a long effective interaction length sufficient to obtain the non-linear optical effects can be secured. Thus strong green second-harmonic laser light can be obtained.

Further, this embodiment employs the non-linear optical crystals which can generate both of the fundamental-wave laser light and the second-harmonic laser light. Thus the number of components of this embodiment is small. Moreover, there are little losses of the laser light. Furthermore, in case of this embodiment, the fundamental-wave laser light is confined in the laser resonator, and only the second-harmonic laser light is extracted to the outside. Thereby, an extremely efficient oscillation can be achieved.

Moreover, the non-linear optical crystals 11a, 11b, 11c and 11d employed in this embodiment are negative crystals of the type TYPE1. The plane of polarization of the fundamental-wave laser light $L_1$ intersects perpendicularly to that of polarization of the second-harmonic laser light $L_2$. Thus there occurs no interaction between them. Consequently, the beam quality of the second-harmonic laser light is exceedingly good.

Additionally, as above described, the number of components of this embodiment is small. Thus the present invention is very advantageous to improvement of reliability, facilitation of regulation and decrease in manufacturing cost.

While a preferred embodiment of the present invention has been described above, it is to be understood that the present invention is not limited thereto and that other modifications will be apparent to those skilled in the art without departing from the spirit of the invention. For example, in the above described embodiment, the NYAB crystals are employed as the non-linear optical crystals. However, crystals of EYAB($Er_xY_{1-x}Al_3(BO_3)_4$), Nd:MgO:LiNbO$_3$, ND:KTP, ND:KDP, Nd:BBO, ND:LBO or Nd:KNbO$_3$ may be employed as the non-linear optical crystals. Further, in the above described embodiment, the non-linear optical crystals are pumped at the side surface thereof by employing the flash lamp as the pump source. However, the non-linear optical crystals may be pumped at the side or end surface thereof by employing a semiconductor laser, a semiconductor laser array or the like as the pump source. Furthermore, a Pockels element or an acoustooptic element may be employed as the Q-switch element.

The scope of the present invention, therefore, is to be determined solely by the appended claims.

What is claimed is:

1. A solid state laser comprising:
    a laser resonator having a pair of mirrors;
    a plurality of non-linear optical self-frequency-doubling crystals placed between the pair of mirrors so that the plurality of non-linear crystal have a common optical axis; and
    a pump source disposed longitudinally to an optical axis of said laser resonator and providing pump light to the plurality of non-linear optical crystals, each of the plurality of non-linear optical crystals generating both a fundamental-wave laser light and a harmonic laser light in response to the pump light, wherein a first crystallographic axis of each of the plurality of non-linear optical crystals is perpendicular to the common optical axis thereof including a progress direction of the fundamental-wave laser light propagating through the plurality of non-linear optical crystals and the first crystallographic axis of each non-linear optical crystal is rotated by 180° around the common optical axis in relation to the first crystallographic axis of an adjacent non-linear optical crystal, wherein a difference between the progress direction of the fundamental-wave laser light and a wave-surface progress direction of a cophasal-wave light are cancelled.

2. The solid state laser according to claim 1, wherein a Q-switch element is placed in the laser resonator.

3. The solid state laser according to claim 1, wherein the plurality of non-linear optical crystals are accommodated in a transparent tube.

4. The solid state laser according to claim 3 wherein the transparent tube is a Ce-doped quartz tube.

5. The solid state laser according to claim 1, wherein the plurality of non-linear optical crystals are made of NYAB($Nd_xY_{1-x}Al_3(BO_3)_4$).

* * * * *